United States Patent [19]
Hannon

[11] 3,747,569
[45] July 24, 1973

[54] HORSE TWITCH
[76] Inventor: Paul Hannon, Cisco, Ill.
[22] Filed: Feb. 25, 1972
[21] Appl. No.: 229,270

[52] U.S. Cl. ............................................... 119/96
[51] Int. Cl. ........................................ A01k 29/00
[58] Field of Search ................................... 119/96

[56] References Cited
UNITED STATES PATENTS
719,579  2/1903  Friesen ............................... 119/96
761,926  6/1904  Van Loghem ...................... 119/96
1,166,708  1/1916  Murray ............................... 119/96

Primary Examiner—Russell R. Kinsey
Assistant Examiner—J. N. Eskovitz
Attorney—Raymond R. Kimpel

[57] ABSTRACT

A device comprising two hinged arms with a retaining strap at their free ends adapted to be applied to the nose of a horse or other animal to temporarily restrain said animal.

1 Claim, 2 Drawing Figures

Patented July 24, 1973

3,747,569

HORSE TWITCH

This invention relates to new and useful improvements in devices for subduing animals commonly referred to as "twitches."

It is an object of this invention to provide a device which can be quickly and readily applied to the mouth or lip of an animal to subdue the animal to the extent that he can be controlled while working with or upon the animal. It is another object of this invention to provide such a device which will remain in place but will not cut, abrade or injure the animal in any way but will nevertheless allow the animal to be controlled. A further object of this invention is to provide such a device which is simple to construct and inexpensive to manufacture.

Further objects and advantages will become apparent from an inspection of the accompanying drawings in which.

Figure 1:
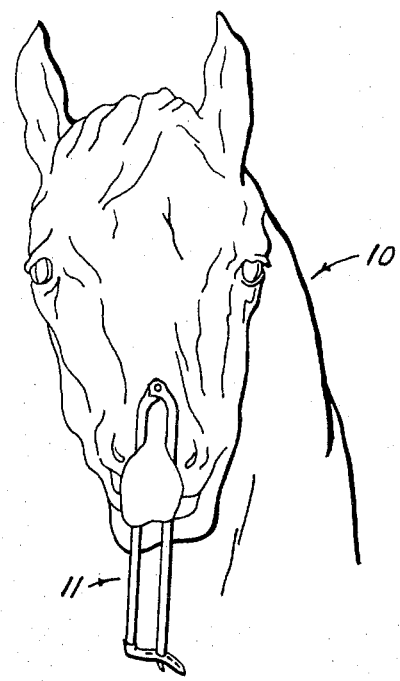
FIG. 1 is a general view showing the twitch in position on a horse.
Figure 2:
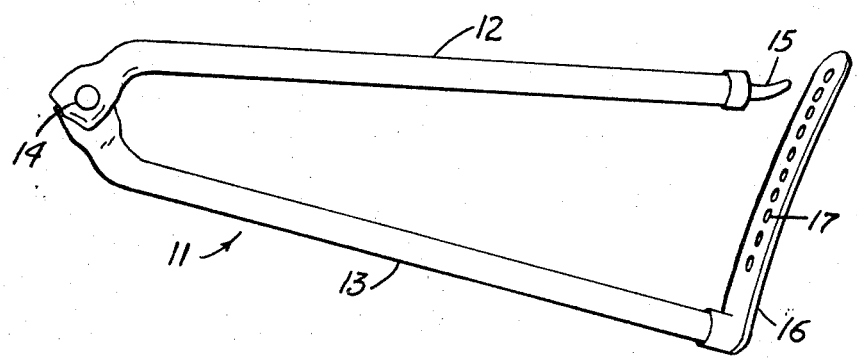
FIG. 2 is a general view showing the twitch.

In the practice of this invention there is provided two distinct arms 12 and 13 which are joined at one extremity by a connecting means 14. The arms 12 and 13 are constructed of a rigid tubular material preferably of an aluminum alloy of high strength with smooth surface. The arms may also be constructed of solid rods of cylindrical cross-section, the selection of the materials used being a matter of choice limited only by the requirement that sufficient rigidity be maintained. In the preferred embodiment, solid aluminum alloy rods are used and at one extremity said rods are flattened so that the two arms 12 and 13 can be pivotally joined by a connector 14. At the opposite end of arm 13 there is a retaining strap 16 adapted to be received onto the end of arm 13. Said retaining strap 16 has a plurality of apertures 17. At the end of arm 12 opposite to its connector end there is a retaining hook 15 which is adapted to engage one of the apertures 17 in the retaining strap 16. Said hook 15 has an outward curvature so that when the twitch is applied to the nose or the upper lip of a horse the pressure outwardly against the arms 12 and 13 serves to maintain the engagement between the retaining hook 15 and the retaining strap 16. At the same time the twitch may be readily and quickly removed from the horse by a sharp pull on the retaining strap 16 so that the retaining hook 15 is disengaged from the aperture 17. By selecting the proper aperture 17 it will be seen that the proper degree of pressure can be applied to the horse's nose or lip to subdue or restrain each individual animal.

While I have shown and described a preferred embodiment of my invention it will be apparent to one skilled in the art that various changes in the details of construction and choice of materials could be made without departing from the sphere and scope of the invention as claimed in the appended claim:

I claim:

1. A horse twitch comprising two substantially parallel arms of cylindrical cross section curved at one end thereof and pivotally connected by connecting means, a retaining strap at the other end of one of said arms, said retaining strap being of a resilient material having a plurality of apertures therein in lateral spaced relation, a retaining hook at the other end of said other arm adapted to engage selectively one of said apertures, said retaining hook being pointed on the end thereof and deflected outwardly away from said first parallel arm and curved so as to engage one of said apertures and tend to remain so engaged upon pressure being applied between said parallel arms and outwardly therefrom, said retaining strap having a cylindrical wall formed on the end thereof opposite said apertures adapted to frictionally receive said second parallel arm.

* * * * *